March 9, 1937. O. M. DEAN 2,073,196
FUR CUTTING MACHINE
Filed Jan. 23, 1935 3 Sheets-Sheet 1
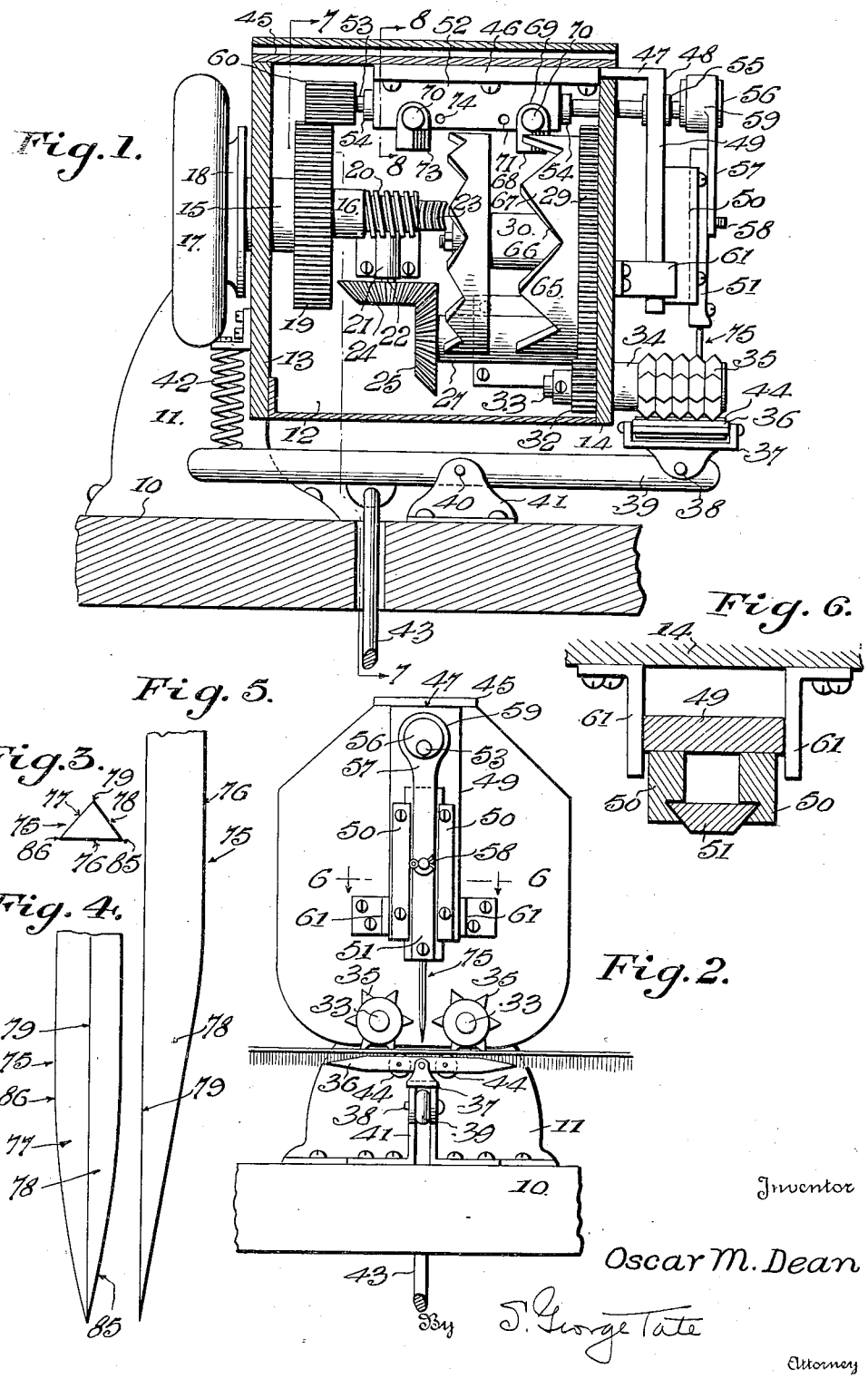
Inventor
Oscar M. Dean
By J. George Tate
Attorney

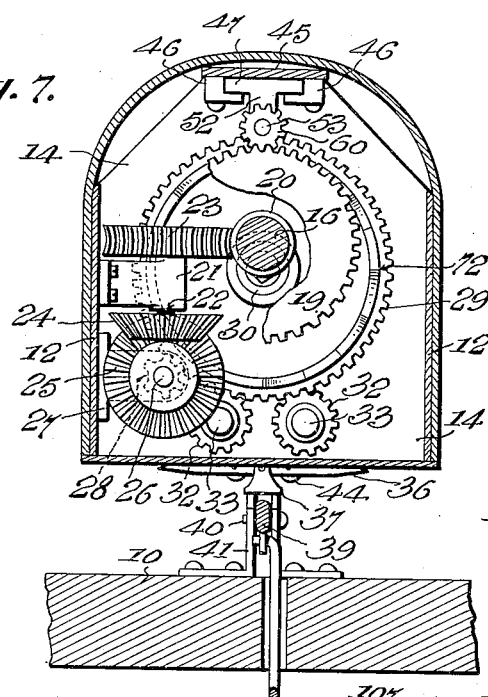

March 9, 1937.  O. M. DEAN  2,073,196
FUR CUTTING MACHINE
Filed Jan. 23, 1935  3 Sheets-Sheet 3
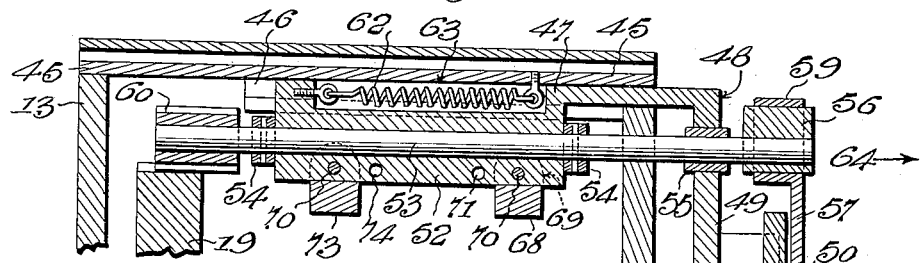
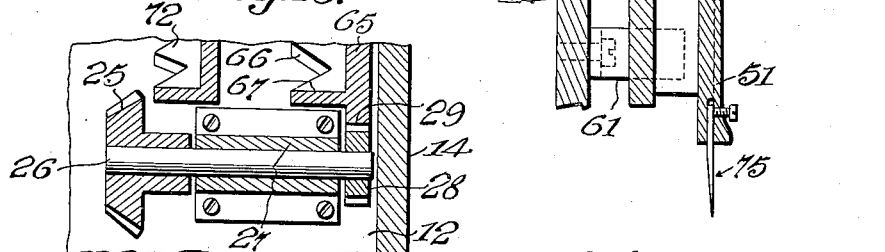
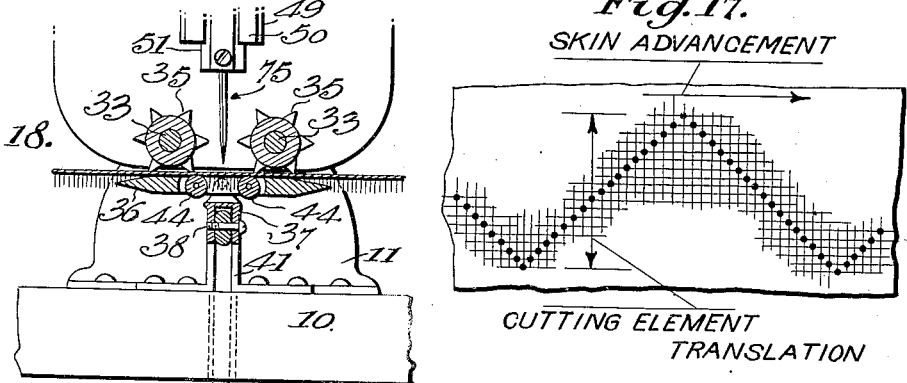
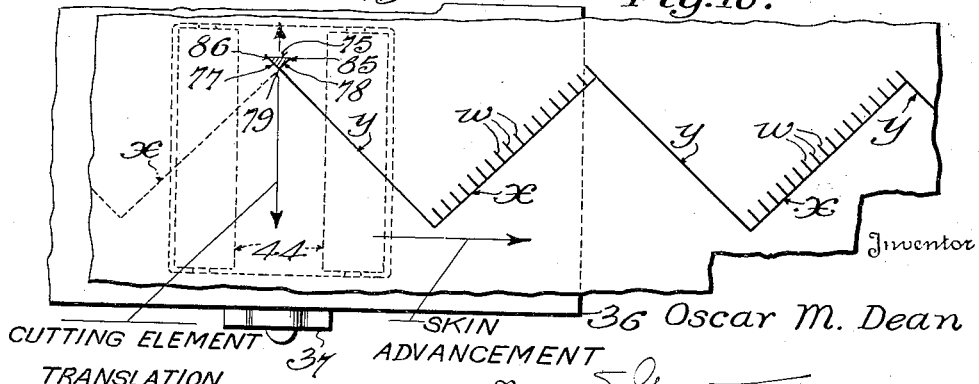
Inventor
Oscar M. Dean
By J. George Tate
Attorney Patented Mar. 9, 1937

2,073,196

UNITED STATES PATENT OFFICE 2,073,196

FUR CUTTING MACHINE

Oscar M. Dean, Sioux City, Iowa

Application January 23, 1935, Serial No. 3,118

27 Claims. (Cl. 164—50)

My invention relates to the art of notching the edges of furs which are to be sewed together. It has been learned in the fur garment industry that the line of stitching between two skins may be fairly well concealed by providing the edges of the skins with registering notches and sewing the skins together along the edges of these notches. The notches are tri-angular in shape and preferably formed with edges disposed at 90° to each other.

The object of the present invention is to provide a machine by means of which these notches can be rapidly and very accurately cut in the furs. At the present time it is considered necessary to cut these notches by hand, and furriers have acquired considerable skill in the use of a fur knife. The inaccuracy, however, which is characteristic of the human hand, makes it practically impossible ever to obtain a perfect match in the notches of skins thus cut, when sewed together. My invention provides a machine which obtains this accuracy.

Another object of my invention is to provide a machine which is of comparatively simple, durable, and inexpensive construction.

A further object is to provide a machine which is very rapid in operation and which produces a succession of relatively narrow individual cuts conjointly forming a continuous zig-zag or notched-line cut.

The most important requirement in notching furs, next to the accuracy of the notches, is that the cutting shall be done without clipping any of the hairs of the fur. It can be readily seen, if scissors or any sort of shearing device were to be used, that the hairs which lie over the line of cut would be clipped and shortened. When the furs were sewed together, these shortened hairs would very definitely mark the seam between the skins. This has been avoided in the past by the skill of the hand operator in cutting the fur from the side opposite the hairs. However, it constitutes a real problem when the cutting of the furs by machinery is contemplated. This problem has undoubtedly been the obstacle which has so far stood in the path of the machine cutting of furs.

My invention overcomes this problem by the use of a reciprocating slender cutting element which passes through or pierces the skin at right angles to the surface thereof and cuts a very short portion of the line of cut during a single piercing operation. This is the basic feature of my invention.

Another object of my invention is to provide an arrangement in which the notching effect is obtained by a combined translatory movement of the cutting element in a direction at right angles to its axis of reciprocation and the movement of the skin in a direction at right angles both to the direction of reciprocation of the cutting element and the direction of translatory movement of the cutting element.

Another object of the invention is to provide a machine of the character stated in which is included means for varying the translatory movement of the cutting element to vary the proportions of the zig-zag or notched-line cut.

Another object of the invention is to provide a novel form of cutting element including a piercing or penetrating point and faces bearing angular relation complementary to the angles of the notches to be formed in the skins and terminating in cutting edges merging into the point and capable of forming each zig and zag of the zig-zag or notched-line cut by a succession of relatively short individual cuts.

With these and other objects in view, my invention consists in the construction, arrangement and combination of the various parts of my device, whereby the objects contemplated are attained, as hereinafter more fully set forth, pointed out in my claims, and illustrated in the accompanying drawings in which:—

Figure 1 is a longitudinal, sectional view through the machine of my invention.

Figure 2 is a front elevation of the machine.

Figure 3 is an inverted, plan view of the cutting element.

Figure 4 is a front elevation of the same.

Figure 5 is a right, side elevation of the same.

Figure 6 is a horizontal, sectional view taken on the line 6—6 of Figure 2.

Figure 7 is a vertical sectional view taken on the line 7—7 of Figure 1.

Figure 8 is a detail, sectional view taken on the line 8—8 of Figure 1.

Figure 9 is a somewhat diagrammatic plan view illustrating a portion of a skin and a portion of a zig-zag or notched-line cut in the process of formation.

Figure 10 is a detail, sectional view through the axis of the cams which produce translatory movement of the cutting element.

Figure 11 is an inverted, plan view of one of the cam followers.

Figure 12 is a plan view of a modified form of the carriage.

Figure 13 is a transverse, sectional view taken on the line 13—13 of Figure 12.

Figure 14 is a longitudinal sectional view through the carriage.

Figure 15 is a longitudinal sectional view through the transmission shaft assembly.

Figure 16 is a diagrammatic plan view illustrating a continuous zig-zag or notched-line cut and the directions of advancement of the skin and translatory movement of the cutting element.

Figure 17 is a diagrammatic plan view illustrating the effect of relatively shifting the skin and the cutting element in timed relation.

Figure 18 is a detail vertical cross section of the skin supporting plate and the feed rollers.

The machine comprises a base 10 which supports a bracket 11 on which the cutting head is mounted. The cutting head has a box or frame including the side walls 12, the rear wall 13, and the front wall 14. In a suitable bearing 15 on the rear wall 13 is mounted a shaft 16 at the outer end of which is secured a combined flywheel 17 and pulley 18. Within the cutter head frame, a gear 19 is secured to the shaft 16 and a worm 20 is formed on or secured to the end of the shaft.

Journalled in a bearing 21 secured to a side wall 12 is a shaft 22 to the upper end of which is secured a worm wheel 23 meshing with the worm 20. To the lower end of the shaft 22 is secured a bevel gear 24 which meshes with the bevel gear 25, mounted on a transmission shaft 26.

The shaft 26 is journalled in the bearing 27 secured to the side wall 12, and to its other end is secured a pinion 28. See Fig. 15.

The pinion 28 meshes with a spur gear 29 mounted on a sleeve 30, which in turn is journaled on the stud 31 secured in the front wall 14. See Fig. 10.

Two pinions 32 secured to a pair of shafts 33 supported horizontally and in spaced relation in bearings 34 on the front wall 14 mesh with the spur gear 29 for the purpose of having rotation imparted thereto from said gear. To the free end of the shafts 33 are secured a pair of hide advancing or feed rollers 35.

Co-acting with the rollers 35, is a skin supporting plate 36 mounted in a yoke 37 which is pivoted as at 38 upon a swinging lever 39. The lever 39 is fulcrumed at 40 in a bracket 41 secured to the base 10. A compression spring 42 urges the rear end of the lever downwardly, thus urging the skin supporting plate upwardly toward the feed rollers 35. Upward pressure from a suitable foot lever (not shown) delivered by a push rod 43, serves to effect separation between the plate 36 and the rollers 35 to allow a skin to be inserted therebetween.

Rollers 44 may be mounted in the skin support 36 to facilitate the movement of the skins thereover.

A bridge bar 45 connects the upper ends of the walls 13 and 14, and secured to the bridge bar 45 is a pair of guides 46 which slidably support the horizontal slide member 47 of the carriage 48. The carriage includes a vertical, depending arm 49, to which is secured a pair of guides 50 between which is slidably mounted the cutter element carrier or chuck 51.

The horizontal arm 47 of the carriage has a central depending rib 52, and a cutting element reciprocating shaft 53 extends longitudinally through the rib 52 and has rotative bearing therein. Collars 54 secured to the cutting element reciprocating shaft prevent longitudinal movement of the shaft relative to the carriage. The shaft 53 extends forwardly through the arm 49 and is journalled in a bushing 55 therein. Upon the front end of the shaft is secured an eccentric cam 56. A pitman 57 is pivoted at 58 to the carrier 51 and has a sleeve portion encircling the cam 56.

On the opposite end of the shaft 53 is secured a pinion 60 which meshes with the drive gear 19. The pinion 60 is long enough so that as the carriage moves longitudinally of the machine, the pinion will remain in mesh with the gear 19, the teeth of the pinion sliding relative to the teeth of the gear.

A pair of guides 61 secured to the forward wall 14 retain the lower end of the depending arm 49 of the carriage against lateral movement as the carriage moves longitudinally.

A pull-spring 62 is secured at its rear end to the carriage 47 and at its forward end to the bridge bar 45. The pull-spring 62 lies in a groove 63 in the arm 47 of the carriage. The pull of the spring tends to move the carriage forwardly, in the direction indicated by the arrow 64 in Fig. 14.

In order to move the carriage rearwardly, I provide a crown cam 65, which may be formed as a part of the gear 29 or secured to the sleeve 30, and which rotates in unison with the gear. The notch faces 66 of the teeth 67 of the crown cam engage against a cam follower 68, secured to the rib 52 of the carriage. The follower 68 in horizontal cross-section is tri-angular shaped as shown in Fig. 11. The upper extremity of the follower is formed with a pair of arms 69 (Fig. 8) which embrace the rib 52 and are secured thereto by thumb screws 70 extending therethrough and into the rib 52.

The object of thus securing the follower is to provide for adjustment. It should be understood that the thumb screws are removably receivable in suitable threaded apertures in the rib 52 and by removing these screws and the follower and shifting the follower and applying the screws to similar auxiliary apertures 71 in the rib the follower will be secured in position out of engaging relation with the crown cam 65. An auxiliary crown cam 72, having a greater number of teeth than the cam 65, co-acts with an auxiliary follower 73 shaped to fit the cam 72, the follower 73 being shown positioned out of engagement. It may be positioned in engagement with its cam by securing it to the threaded holes 74 in the same manner as the other follower.

The machine is thus selective for two different sizes of notches, since the size of a notch depends upon the relative number of reciprocations of the carriage compared with the speed of travel of the work. Since the latter is constant, variations of the former will produce a variation in the size of the notch. The small cam is used for Hudson seal and the larger for northern seal.

The follower blocks may be controlled by a lever as shown in Figs. 12 and 13, wherein the blocks are formed with ears shaped as at 100 in Fig. 13, and slidably mounted in grooves 101 in the depending rib 52ª of the carriage.

A lever 102 is pivoted at 103 in a slot 104 in the rib 52ª, and is connected to a pair of ears 105 on the follower blocks 68 and 73, respectively by a pair of links 106, pivoted at 107 and 108 to the ears 105 and lever 102 respectively.

A pin 109 mounted in the rib 52ª, engages an opening 110 in the lever 102 to hold the lever in the position shown in Fig. 12, wherein the follower blocks are positioned so that the carriage is actuated by the secondary cam 72.

A pin 111, similar to the pin 109, engages the opening 110 to secure the lever in a reverse position wherein the follower blocks are spread apart to bring the forward follower block into engagement with the primary cam 65. The ends of the pins 109 and 111 are rounded to allow the lever 102 to spring past them.

In Figs. 3, 4, and 5 of the drawings I have disclosed a novel form of cutting element capable of forming the desired zig-zag or notched-lined cut and generally designated 75. This cutting element is very slender and resembles a needle in appearance but, unlike a needle, includes cutting edges and is capable of cutting fur. In horizontal cross-section, it is triangular as shown in Fig. 3. The upper or major portion of the rear face of the cutting element is parallel to and adjacent the wall 14 and perfectly straight and vertical as indicated at 76 in Fig. 5. The lower portion of the face 76 curves or slopes forwardly as shown at the lower part of Fig. 5 to intersect the faces 77 and 78 and form lateral cutting edges 85 and 86. The two faces, 77 and 78, of the cutting element are equal in area and width and converge forwardly to form a central corner or edge 79 which is perfectly straight and vertical and terminates at its lower end in a penetrating or piercing point flanked at either side by the converging cutting edges 85 and 86.

The faces 77 and 78 are so inclined relative to each other that the angle formed between them, in a horizontal cross-section of the cutting element, is equal to the angle between the sides of the cut to be produced in the work. In other words the faces 77 and 78 bear the same angular relation as do the individual zigs and zags of the zig-zag or notched-line cut. The cutting of portions of a zig and a zag which cooperate to form a single notch is shown in Fig. 9, wherein the skin is indicated by the reference character 80, and the edges of the cut by the reference character 81. The waste material which is trimmed from the edge of the skin is indicated at 82.

Assuming that the skin is being fed between the plate 36 and the rollers 35 in the direction indicated by the arrow 83, while the cutting element, shown in cross-section of Fig. 9, is traveling in the direction indicated by the arrow 84, it will be seen that the face 78 of the cutting element will be exactly parallel to the edge of the portion of the cut 81 in process of formation. The smooth edges 81 of the cut result from the cutting effect of the sharp edges 85 and 86, the angular relation which they bear, one to the other, and the constantly timed relative movements of which the skin and the cutting element partake.

In Fig. 16 of the drawings I have illustrated a portion of a continuous zig-zag or notched-line cut and the relative movements of which the skin and the cutting element partake in bringing about the angular relation of the individual zigs and zags. The result of slowly advancing the skin and slowly translating the cutting element back and forth across the path of advancement of the skin in constantly timed relation, is the formation of a continuous zig-zag or notched-line cut, each zig $x$ and each zag $y$ of which is formed by a rapid succession of individual narrow cuts formed by the cutting element as shown in Fig. 9.

In Fig. 17 I have diagrammatically illustrated how the penetrating or piercing point of the cutting element always strikes the desired line of cut. This is made possible because any given unit or distance of skin movement is attended by a like unit or distance of translatory movement of the cutting element and consequently the point of the element will always strike the skin in the desired line of cut as shown by the heavy dots in Fig. 17. The crossed light lines therefore illustrate what might be termed units of movement, of advancing movement with respect to the skin, and of movement of translation with respect to the cutting element.

It will be obvious that a single piercing action or penetration of a skin by the cutting element shown in detail in Figs. 3, 4, and 5 will form a two-sided, three cornered cut as a result of the action of the point forming the terminus of the edge 79 and the cutting edges 85 and 86 which recede upwardly and laterally-angularly therefrom. In my machine the parts are so timed that the individual penetrations of the point, indicated by heavy dots in Fig. 17, are spaced apart less than the width of the respective faces 77 and 78. Thus when the cutting element translatory movement is forward, or during the formation of the zigs $x$ in Fig. 16, the cutting element, at each downward movement will engage and penetrate or pierce a solid or uncut portion of skin and the angular cut formed by the cutting edge 85 will aline with and merge into the previously made cut to form the desired continuous line cut, whereas the angularly disposed cut formed by the companion edge 86 will be superfluous and will extend into the waste portion of the skin as indicated at $w$. It is to be understood that the waste cuts $w$ are exaggerated in this diagrammatic illustration, and in the actual cutting of the skin, when the natural resilience of the skin body will permit a degree of stretch and deflection, these cuts will be hardly noticeable. When the cutting element translatory movement is rearward, however, or during the formation of the zags $y$ in Fig. 16, the cutting element, at each downward movement will enter a previously made cut in the skin and the edge 85 will be effective only to deflect the unresisting edge of the previously cut skin portion whereas the cutting edge 86, now alined with the line to be cut, is effective to cut along the desired line.

The translatory movement of the cutting element is produced by the cam 65 or 72 and the spring 62 acting in opposite directions against the horizontal arm 47 of the carriage to slide the arm in the guides 46. The arm 49 of the carriage slides between the guide brackets 61 and carries with it the cutting element reciprocating mechanism including the chuck 51 and the eccentric mechanism 56 to 59. The cam 65 moves the carriage rearwardly and spring 62 returns the carriage in an opposite direction.

As the carriage slides in and out, the pinion 60 will slide relative to the gear 19 without losing its mesh therewith.

The motion of the cutting element will be quite rapid compared to the motion of the carriage and rollers 35, and this difference in speeds is obtained by employing the worm 20 to step down the speed to the carriage reciprocating mechanism and advancing rollers and by employing the large gear 19 and small pinion 60 to step up the speed to the cutting element. By mounting both worm 20 and gear 19 on the same shaft, a constant ratio between the respective speeds of the carriage control mechanism and cutting element drive mechanism is assured.

The present invention accomplishes the machine cutting of fur by piercing the same transversely of its plane with a series of narrow cuts, progressively arranged in the fur along the desired line of cut and conjointly forming a continuous line cut, the necessary relative movement of translation between the fur and the piercing device being slow as compared with the piercing movement.

It will be observed by reference to Figures 1 and 16 of the drawings that the translatory movement of which the cutting element partakes is confined within and spanned by the zone of operation or feed path of the hide advancing rollers 35 thus assuring the proper feeding and supporting of the hide during the cutting operation.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim:—

1. In a fur notching machine, a frame, a carriage slidably mounted in the frame, a carrier slidably mounted on the carriage for movement in a direction at right angles to the direction of movement of the carriage, a carrier reciprocating shaft journaled in the carriage, reciprocating means connecting said shaft and the carrier, a slender hide cutting element mounted in the carrier, means for rotating the shaft, means for reciprocating the carriage, and hide advancing means for moving the hide at right angles both to the direction of reciprocation of the carriage and the direction of reciprocation of the carrier.

2. In a fur notching machine, a frame, a carriage slidably mounted in the frame, a carrier slidably mounted on the carriage for movement in a direction at right angles to the direction of movement of the carriage, a slender hide cutting element mounted in the carrier, means for transmitting reciprocatory movement to the element, means for causing reciprocation of the carriage, hide advancing means for moving the hide in a direction at right angles both to the direction of reciprocation of the carriage and to the direction of reciprocation of the element, said carriage reciprocating means comprising a crown cam and a cam follower mounted directly on the carriage in a position to directly engage said cam.

3. In a fur notching machine, a frame, a carriage slidably mounted in the frame, a carrier slidably mounted on the carriage for movement in a direction at right angles to the direction of movement of the carriage, a slender hide cutting element mounted in the carrier, means for transmitting reciprocatory movement to the element, means for causing reciprocation of the carriage, hide advancing means for moving the hide in a direction at right angles both to the direction of reciprocation of the carriage and to the direction of reciprocation of the element, said carriage reciprocating means comprising a plurality of selective cams each having a different movement effecting surface, and a cam follower mounted on the carriage and selectively engageable with said cams.

4. In a fur notching machine, a frame, a carriage slidably mounted in the frame, a carrier slidably mounted on the carriage for movement in a direction at right angles to the direction of movement of the carriage, a slender hide cutting element mounted in the carrier, means for transmitting reciprocatory movement to the element, means for causing reciprocation of the carriage, hide advancing means for moving the hide in a direction at right angles both to the direction of reciprocation of the carriage and to the direction of reciprocation of the element, said carriage reciprocating means comprising a plurality of selective cams each having a different movement effecting surface, and means for causing the carriage to move under the influence of a selected one of said cams.

5. In a fur notching machine, a frame, a carriage slidably mounted in the frame, a carrier slidably mounted on the carriage for movement in a direction at right angles to the direction of movement of the carriage, a slender hide cutting element mounted in the carrier, means for transmitting reciprocatory movement to the element, means for causing reciprocation of the carriage, hide advancing means for moving the hide in a direction at right angles both to the direction of reciprocation of the carriage and to the direction of reciprocation of the element, said carriage reciprocating means comprising a pair of crown cams co-axially mounted and each having a different movement effecting surface, and a cam follower mounted on the carriage and selectively engageable with said cams.

6. In a fur notching machine, a slender cutting element adapted for forming very narrow cuts in a fur bearing hide, means for reciprocating the element longitudinally, means for translating the reciprocating element back and forth between fixed end positions and at right angles to its direction of reciprocation, and hide advancing means for moving the hide in a direction at right angles to the directions of both reciprocatory and translatory movements of the element, said element translating means including a crown cam, a carriage supporting said element and a cam follower mounted directly upon said carriage and directly engageable with the cam.

7. In a fur notching machine, a slender cutting element adapted for forming very narrow cuts in a fur bearing hide, means for reciprocating the element longitudinally, means for translating the reciprocating element back and forth between fixed end positions and at right angles to its direction of reciprocation, and hide advancing means for moving the hide in a direction at right angles to the directions of both reciprocatory and translatory movements of the element, said element translating means including a plurality of selective cams each having a different movement effecting surface, and a cam follower selectively engageable with said cams.

8. In a fur notching machine, a slender cutting element adapted for forming very narrow cuts in a fur bearing hide, means for reciprocating the element longitudinally, means for translating the reciprocating element back and forth between fixed end positions and at right angles to its direction of reciprocation, and hide advancing means for moving the hide in a direction at right angles to the directions of both reciprocatory and translatory movements of the element, said element translating means including a pair of crown cams co-axially mounted and a cam follower selectively engageable with said cams.

9. In a fur notching machine, a slender cutting element adapted for forming very narrow cuts in a fur bearing hide, means for reciprocating the element longitudinally, means for translating the reciprocating element back and forth between fixed end positions and at right angles to its direction of reciprocation, and hide advancing means for moving the hide in a direction at right angles to the directions of both reciprocatory and translatory movements of the element, said element translating means including a plurality of selective cams each having a different movement effecting surface, and means for transmitting movement from a selected one of said cams to said element.

10. In a fur notching machine, a driven shaft, a carriage mounted for translatory, reciprocating movement, a gear on the driven shaft, a cutter element reciprocating shaft journaled in the carriage parallel to said driven shaft and provided with a pinion meshing with said gear and axially slidable relative thereto, a cutter element carrier slidably mounted in the carriage for movement in a direction at right angles to the axes of said shafts, reciprocating means connecting said carrier with the cutter element reciprocating shaft, a crown cam co-acting with the carriage rotatable about an axis parallel to the axes of said shafts, reduction gearing connecting said driven shaft with said crown cam, and hide advancing means geared in step with said cam and adapted to advance the hide in a direction at right angles both to the direction of reciprocation of the cutting element and to the direction of reciprocation of said carriage.

11. In a fur cutting machine, the combination of a reciprocating hide cutting element, a rockably mounted hide support, and means to advance the hide over the support in the zone of operation of said element.

12. In a fur cutting machine, the combination of a reciprocating hide cutting element, hide advancing means, a rockably mounted hide support opposing said advancing means, and means to yieldably hold the advancing means, the support and the hide in mutual engagement.

13. In a fur cutting machine, the combination of a reciprocating hide cutting element, a pair of hide advancing rollers disposed one at each side of and adjacent said element, a rockably mounted hide support opposing said rollers, and means to hold the rollers, the support and the hide in mutual engagement.

14. In a fur cutting machine, the combination of a reciprocating hide cutting element, a pair of hide advancing rollers disposed one at each side of and adjacent said element, a tiltably mounted hide support opposing said rollers, means to hold the rollers, the support and the hide in mutual engagement, and means for effecting separation between the rollers and the support to permit insertion and withdrawal of the hide.

15. In a fur cutting machine, the combination of a reciprocatory hide cutting element, means to impart reciprocation and reciprocatory movement of translation to said element, hide advancing means, and a hide support opposing said advancing means and having therein an elongated relatively narrow opening permitting the reciprocatory and translatory movements of which the element partakes and also free deflection of hide hairs to prevent severance thereof.

16. In a fur cutting machine, the combination of a reciprocatory hide cutting element, means to impart reciprocation and reciprocatory movement of translation to said element, a pair of hide advancing rollers disposed one at each side of and adjacent said element, a hide support opposing said rollers and having therein an elongated opening permitting the reciprocatory and translatory movements of which the element partakes and also free deflection of hide hairs to prevent severance thereof, and means for effecting separation between the rollers and the support to permit insertion and withdrawal of the hide.

17. In a fur notching machine, a driven shaft, a gear mounted thereon, a carriage slidably mounted for reciprocatory movement, a cutter element reciprocating shaft journaled in said carriage parallel to said driven shaft, a pinion on said cutter element reciprocating shaft meshing with said gear, a cutter element carrier slidably mounted in the carriage for reciprocating movement in a direction at right angles to the axes of said shafts, reciprocating means connecting said carrier and said cutter element reciprocating shaft, a hide cutting element movable with the carrier, a crown cam rotatable about an axis parallel to the axes of said shafts, reduction gearing connecting said crown cam with said driven shaft and co-acting with the carriage to move it in one direction, resilient means to move the carriage in the opposite direction, a hide advancing gear mounted co-axially with the crown cam, and a hide advancing roller provided with a pinion meshing with the said last named gear and positioned adjacent the cutting element.

18. In a fur notching machine, the combination of a cutting element triangular in cross section and terminating in a penetrating point, one edge of the element formed by the merging of two faces thereof being continuously straight and parallel the axis of the element, means for reciprocating the element axially, means for translating the element in a direction perpendicular to said straight edge, and hide advancing means for advancing the hide in a direction perpendicular to said straight edge and perpendicular to the axis of the element.

19. In a fur notching machine, the combination of a cutting element that is triangular shaped in cross-section, having three faces, one of which is in part straight and flat, and the other two faces of which form an angle substantially equal to the angle to be formed between the edges of the notches to be cut in the fur, the remaining part of said one face intersecting said two faces to form a penetrating point and cutting edges at the lower terminus of said two faces, means for reciprocating the element in a direction parallel to said straight face, means for translating the element back and forth in a direction perpendicular to said straight face, and hide advancing means for moving the hide in a direction parallel to said straight face and perpendicular to the direction of reciprocation of said element.

20. In a fur notching machine, the combination of a cutting element including a pair of faces bearing angular relation merging in a straight edge and terminating in a penetrating point at the terminus of the straight edge and a pair of cutting edges one at each side of said point, means for reciprocating the element axially parallel to said straight edge, means for translating the element back and forth in a direction perpendicular to said stright edge, and hide advancing means for moving the hide in a direction perpendicular to said direction of translation and perpendicular to said straight edge.

21. In a fur cutting machine, the combination of a slender reciprocating cutting element having a plurality of cutting edges merging in a penetrating point, a hide supporting table having an aperture of limited area to accommodate movement of the piercing element and to provide freedom for hairs of the fur in the cutting area permitting them to be deflected and preventing cutting thereof by the piercing element, and means to bring about relative movement between a fur bearing hide and said element to cause the element to successively penetrate the hide at intervals spaced less than the cross sectional area of said element whereby one or another of said edges will form a succession of cuts conjointly forming a continuous line cut depending upon the direction of said relative movement.

22. In a fur cutting machine, the combination of a slender reciprocating cutting element having a plurality of cutting edges merging in a penetrating point, a hide supporting table having an aperture of limited area to accommodate movement of the piercing element and to provide freedom from hairs of the fur in the cutting area permitting them to be deflected and preventing cutting thereof by the piercing element, means to bring about relative movement between a fur bearing hide and said element to cause the element to successively penetrate the hide at intervals spaced less than the cross sectional area of said element whereby one or another of said edges will form a succession of cuts conjointly forming a continuous line cut depending upon the direction of said relative movement, and means for changing the direction of relative movement to cause another of said edges to become effective to cut a continuous line in angular relation to the first mentioned line cut.

23. In a fur cutting machine, a hide support, a reciprocable cutting element, means to reciprocate the element, a hide supporting table apertured to accommodate movement of the element, a feed roller opposed to said table adjacent the aperture therein, and means for moving the reciprocating element back and forth across the path of advancement of the hide, said roller equipment having feeding engagement with the hide spanning the limits of back and forth movement of the element.

24. In a fur cutting machine, a hide support, a reciprocable cutting element, means to reciprocate the element, a pair of feed rollers disposed in adjacent spaced relation one at each side of the element for advancing the hide past the reciprocating element, and means for moving the reciprocating element back and forth across the path of advancement of the hide, said rollers being of a length for spanning the limits of back and forth movement of the element.

25. In a machine for cutting fur bearing hide, the combination of a reciprocable narrow piercing element, a table for supporting the hide with the bare skin side presented toward the element and having an aperture of limited area to accommodate movement of the element and to provide deflection freedom for the hairs of the hide, and means to reciprocate the element to repeatedly pierce the hide along the desired line of cut between the hairs of the hide deflecting but not cutting said hairs whereby the individual cuts will conjointly form a continuous line cut.

26. In a machine for cutting fur bearing hide, the combination of a reciprocable narrow piercing element, a table for supporting the hide with the bare skin side presented toward the element and having an aperture of limited area to accommodate movement of the element and to provide deflection freedom for the hairs of the hide, means to reciprocate the element to repeatedly pierce the hide along the desired line of cut between the hairs of the hide deflecting but not cutting said hairs, and means to bring about relative movement between the reciprocating element and the hide to cause the individual cuts made by the element to conjointly form a continuous zig-zag cut each zig and zag of which is formed by a succession of individual cuts.

27. In a machine for cutting fur bearing hide, the combination of a reciprocable narrow piercing element, a table for supporting the hide with the bare skin side presented toward the element and having an aperture of limited area to accommodate movement of the element and to provide deflection freedom for the hairs of the hide, means to reciprocate the element to repeatedly pierce the hide along the desired line of cut between the hairs of the hide deflecting but not cutting said hairs, means for advancing the hide past the reciprocating element, and means for translating the reciprocating element back and forth across the path of movement of the hide, the rate of speed of the hide advancing means being such as to move the hide substantially at the same lineal speed as the speed of translatory movement of the element.

OSCAR M. DEAN.